US009103290B2

(12) United States Patent
Ryu et al.

(10) Patent No.: US 9,103,290 B2
(45) Date of Patent: Aug. 11, 2015

(54) CONTROL METHOD FOR CVVL ENGINE

(71) Applicants: Hyundai Motor Company, Seoul (KR); Kia Motors Corporation, Seoul (KR)

(72) Inventors: In Sang Ryu, Hwaseong-si (KR); Jong Bum Park, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 410 days.

(21) Appl. No.: 13/730,228

(22) Filed: Dec. 28, 2012

(65) Prior Publication Data
US 2014/0025276 A1  Jan. 23, 2014

(30) Foreign Application Priority Data

Jul. 20, 2012  (KR) .................. 10-2012-0079404

(51) Int. Cl.
F02D 41/00 (2006.01)
F01L 13/00 (2006.01)
F02D 13/02 (2006.01)
F02D 41/08 (2006.01)
F02D 41/22 (2006.01)

(52) U.S. Cl.
CPC ............ F02D 41/00 (2013.01); F01L 13/0015 (2013.01); F02D 13/02 (2013.01); F01L 2013/0068 (2013.01); F01L 2013/0073 (2013.01); F01L 2800/00 (2013.01); F01L 2800/04 (2013.01); F01L 2800/05 (2013.01); F02D 41/08 (2013.01); F02D 41/22 (2013.01); F02D 2041/001 (2013.01); F02D 2200/023 (2013.01)

(58) Field of Classification Search
CPC ... F02D 13/02; F02D 13/0246; F02D 31/003; F02D 41/221; F01L 13/00; F01L 13/0015; F01L 1/34
USPC ............ 701/102, 110, 114; 123/90.15, 90.19, 123/90.33, 196 R, 339.1; 73/114.03, 114.04, 73/114.24, 114.25, 114.79
See application file for complete search history.

(56) References Cited

U.S. PATENT DOCUMENTS

| 5,184,578 A | * | 2/1993 | Quinn et al. ............... 123/90.17 |
| 5,421,302 A | * | 6/1995 | Livshits et al. ........... 123/339.23 |
| 5,586,536 A | * | 12/1996 | Seo et al. ...................... 123/352 |
| 5,901,682 A | * | 5/1999 | McGee et al. ............ 123/339.19 |
| 6,026,784 A | * | 2/2000 | Weisman et al. ............. 123/436 |

(Continued)

FOREIGN PATENT DOCUMENTS

| JP | 07259972 | * | 3/1994 | ............. F16H 57/12 |
| JP | 2002-256905 A | | 9/2002 | |

(Continued)

Primary Examiner — John Kwon
Assistant Examiner — Johnny H Hoang
(74) Attorney, Agent, or Firm — Morgan, Lewis & Bockius LLP

(57) ABSTRACT

A continuous variable valve lift engine may include determining whether an engine is in an idle state and an oil temperature of an engine is within a predetermined range, controlling, the engine in a predetermined control state when the engine is in the idle state and the oil temperature is within the predetermined range, and measuring, an error occurrence time when an error occurs in controlling the engine in the control state, and controlling the engine while switching the engine to a predetermined passive state when the error occurrence time is more than a preset time.

14 Claims, 3 Drawing Sheets

(56) References Cited

U.S. PATENT DOCUMENTS

| | | | |
|---|---|---|---|
| 2001/0017114 A1* | 8/2001 | Mikame | 123/90.15 |
| 2003/0062009 A1* | 4/2003 | Nohara et al. | 123/90.16 |
| 2005/0103291 A1* | 5/2005 | Magner et al. | 123/90.16 |
| 2006/0011166 A1* | 1/2006 | Ruiz | 123/339.1 |
| 2011/0066351 A1* | 3/2011 | Gallagher et al. | 701/102 |
| 2011/0174250 A1* | 7/2011 | Borde | 123/90.12 |

FOREIGN PATENT DOCUMENTS

| | | |
|---|---|---|
| JP | 2005-171793 A | 6/2005 |
| JP | 2009-013864 A | 1/2009 |

* cited by examiner

CONTROL METHOD FOR CVVL ENGINE

CROSS-REFERENCE TO RELATED APPLICATION

The present application claims priority to Korean Patent Application No. 10-2012-0079404 filed on Jul. 20, 2012, the entire contents of which is incorporated herein for all purposes by this reference.

BACKGROUND OF THE INVENTION

1. Field of the Invention

The present invention relates to a control method for a continuous variable valve lift (CVVL) engine. More particularly, the present invention relates to a control method for a CVVL engine for preventing a knocking phenomenon in an idle state of the engine.

2. Description of Related Art

An internal combustion engine combusts mixed gas in which fuel and air are mixed at a predetermined ratio through a set ignition mode to generate power by using explosion pressure.

In this case, a cam shaft is driven by a timing belt connected with a crank shaft that converts linear motion of a cylinder by the explosion pressure into rotating motion to actuate an intake valve and an exhaust valve, and while the intake valve is opened, air is suctioned to a combustion chamber and while an exhaust valve is opened, gas which is combusted in the combustion chamber is exhausted.

In the operations of the intake valve and the exhaust valve, only when a valve lift and a valve opening/closing time (timing) are controlled according to a rotational speed of an engine, optimal engine performance is secured.

As such, a CVVL device has been developed and applied, in which a plurality of cams that drives the intake valve and the exhaust valve is designed or the intake valve and the exhaust valve are implemented to operate by different valve lifts according to an engine rpm in order to appropriately implement the operations of the intake valve and the exhaust valve according to the rotational speed of the engine.

Meanwhile, when the engine tips in an idle state, a compression ratio is increased and self-ignition occurs due to a sudden increase of an air quantity, and as a result, a knocking phenomenon occurs.

In order to prevent the phenomenon, two methods can be generally used in a vehicle adopting the CVVL device, and one therebetween is to decrease a valid compression ratio by applying an intake cam at a parking position and high-lifting the valve lift and the other one is to decrease the valid compression ratio by maximally advancing the intake cam and low-lifting the valve lift. The second method to maximally advance the intake cam and low-lift the valve lift is more advantageous than the first method in terms of fuel efficiency therebetween.

In the related art, the knocking phenomenon was prevented by decreasing the valid compression ratio by designating one method between the two methods, but when the engine is in the idle state, advancing of the intake cam may be impossible due to insufficient oil pressure. However, in the related art, since a countermeasure considering the case in which the cam advancing is impossible was not provided, appropriate action cannot be taken, and as a result, the knocking phenomenon occurred or the fuel efficiency deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method for a continuous variable valve lift device that can prevent deterioration of fuel efficiency and a knocking phenomenon by effectively decreasing a valid compression ratio even in an idle state of an engine.

In an aspect of the present invention, a control method for a continuous variable valve lift (CVVL) engine may include determining, by a control unit of a vehicle, whether the engine is in an idle state and an oil temperature of the engine is within a predetermined range, controlling, by the control unit, the engine in a predetermined control state when the engine is in the idle state and the oil temperature is within the predetermined range, and measuring, by the control unit, an error occurrence time when an error occurs in controlling the engine in the predetermined control state, and controlling the engine while switching the engine to a predetermined passive state when the error occurrence time is more than a preset time, wherein in the predetermined control state, an intake cam of the CVVL engine is in a maximum advancing state, an engine speed is a set basic idle RPM, and a valve lift is in a predetermined high lift state, and wherein in the predetermined passive state, the intake cam is in a parking state, the engine speed is larger than the basic idle RPM, and the valve lift is in a predetermined low lift state.

The error represents a state in which the intake cam is not advanced.

The control unit monitors a cam timing at the time of controlling the engine in the predetermined control state to determine that the error occurs when a difference between the cam timing when the intake cam is in the maximum advancing state and an actually measured cam timing is more than a set value.

The method may further include switching, by the control unit, the engine to the predetermined control state when an elapsed time after entering the passive state is more than a set value.

The method may further include counting, by the control unit, the number of times to switch the predetermined control state to the passive state, and forcibly maintaining the passive state for a predetermined time when the counted number of times is more than a set value.

The high lift represents a state in which the valve lift is 6 mm or more.

The low lift represents a state in which the valve lift is 2 mm or less.

In another aspect of the present invention, a control system of controlling a continuous variable valve lift (CVVL) engine may include a variable sensor detecting a valve lift value, an oil temperature sensor detecting an oil temperature, a sensor measuring a required torque and rotational speed, a position sensor detecting intake/exhaust cam position, a throttle position sensor detecting an opening level of a throttle valve, a fuel injection sensor measuring a fuel injection amount, a sensor measuring an ignition timing, a cam sensor detecting a cam timing, and a control unit that receives information including the valve lift value, the oil temperature, the required torque and rotational speed, the intake/exhaust cam position, the throttle opening level, the fuel injection amount, the ignition timing, and the cam timing, wherein the control unit determines whether the engine is in an idle state and an oil temperature of the engine is within a predetermined range, wherein the control unit controls the engine in a predetermined control state when the engine is in the idle state and the oil temperature is within the predetermined range, and wherein the control unit measures an error occurrence time when an error occurs in controlling the engine in the predetermined control state, and controlling the engine while switching the engine to a predetermined passive state when the error occurrence time is more than a preset time, wherein in the predetermined control state, an intake cam of the CVVL engine is in a maximum advancing state, an engine speed is a set basic idle RPM, and a valve lift is in a predetermined high lift state, and wherein in the predetermined passive state, the intake cam is in a parking state, the engine speed is larger than the basic idle RPM, and the valve lift is in a predetermined low lift state.

The error represents a state in which the intake cam is not advanced.

The control unit monitors a cam timing at the time of controlling the engine in the predetermined control state to determine that the error occurs when a difference between the cam timing when the intake cam is in the maximum advancing state and an actually measured cam timing is more than a set value.

The control unit switches the engine to the predetermined control state when an elapsed time after entering the passive state is more than a set value.

The control unit counts the number of times to switch the predetermined control state to the passive state, and forcibly maintaining the passive state for a predetermined time when the counted number of times is more than a set value.

The high lift represents a state in which the valve lift is 6 mm or more.

The low lift represents a state in which the valve lift is 2 mm or less.

According to the control method of the continuous variable valve lift engine of the exemplary embodiments of the present invention, even when a control to an control state is impossible because sufficient oil pressure is not formed in the idle state of the engine, the control unit determines that a control to an control state is impossible and perform a control while switching the engine to a passive state, thereby preventing the knocking phenomenon of the engine.

Further, according to the control method of the continuous variable valve lift engine of the exemplary embodiments of the present invention, when a predetermined time elapsed after controlling the engine in the passive state, the engine is controlled by switching the engine to the control state again, thereby improving the fuel efficiency while preventing the knocking phenomenon.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
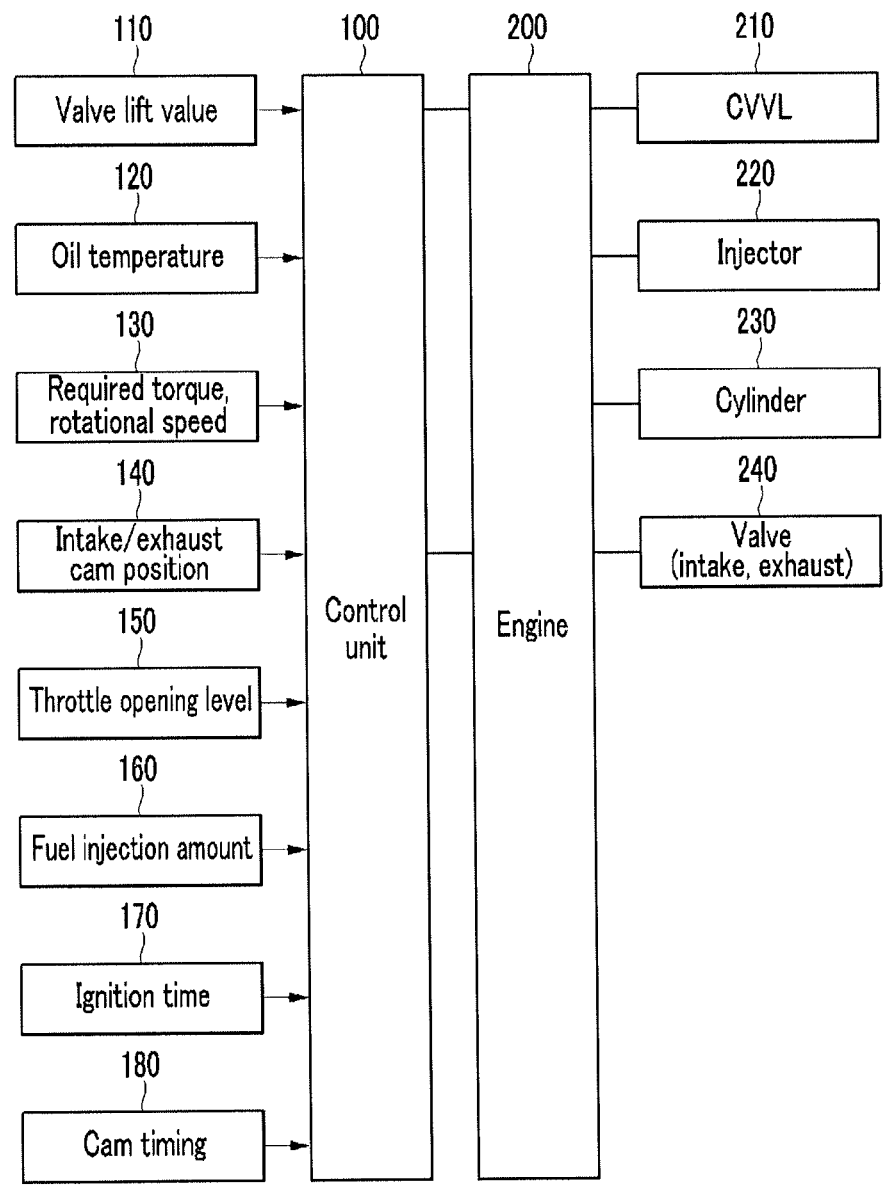
FIG. 1 is a schematic diagram of a control system of a continuous variable valve lift engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described below in detail with reference to the accompanying drawings.

FIG. 1 is a schematic diagram of a control system of a continuous variable valve lift engine according to an exemplary embodiment of the present invention.

As illustrated in FIG. 1, a control unit 100 receives information including a valve lift value, an oil temperature of an engine 200, a required torque and rotational speed, an intake/exhaust cam position, a throttle opening level, a fuel injection amount, an ignition timing, a cam timing, and the like, and controls a continuous variable valve lift (CVVL) 210, an injector 220, a cylinder 230, and an intake/exhaust valve 240 of the engine by using the information.

Various sensors such as, a variable sensor 110 detecting the valve lift value, an oil temperature sensor 120 detecting the oil temperature, a sensor 130 for a required torque and rotational speed, a position sensor 140 for the intake/exhaust cam position, a throttle position sensor 150 detecting an opening level of the throttle valve, a fuel injection sensor 160 for a fuel injection amount, a sensor 170 for measuring the ignition timing, a cam sensor detecting the cam timing, an air flow sensor detecting the intake air quantity, a water temperature sensor detecting cooling water temperature of an engine, an intake temperature sensor detecting an intake air temperature, and the like are mounted on a vehicle to convert an operation state of the engine into electric signals and transfer the electric signals to the control unit 100.

The control unit 100 may be an electronic control unit (ECU), and the ECU analyzes and determines the electric signals received from various sensors to determine the operation states of the vehicle and the engine 200 and controls the CVVL 210, the valve 240, and the like according to the determined operation states.

The engine 200 includes the CVVL 210, the injector 220, the cylinder 230, and the intake or exhaust valve 240, and the continuous variable valve lift device 210 continuously varies the height of the valve lift at which the valve is opened.

The control unit 100 receives information on the engine 200 (for example, an RPM of the engine 200 or a load of the engine 200, the cooling water temperature, the oil temperature, and the like) to distinguish whether the valve lift is under a high lift driving condition or a low lift driving condition to actuate the CVVL 210. Herein, high lift represents a state in which the valve is lifted much and low lift represents a state in which the valve is lifted less.

Figure 2:
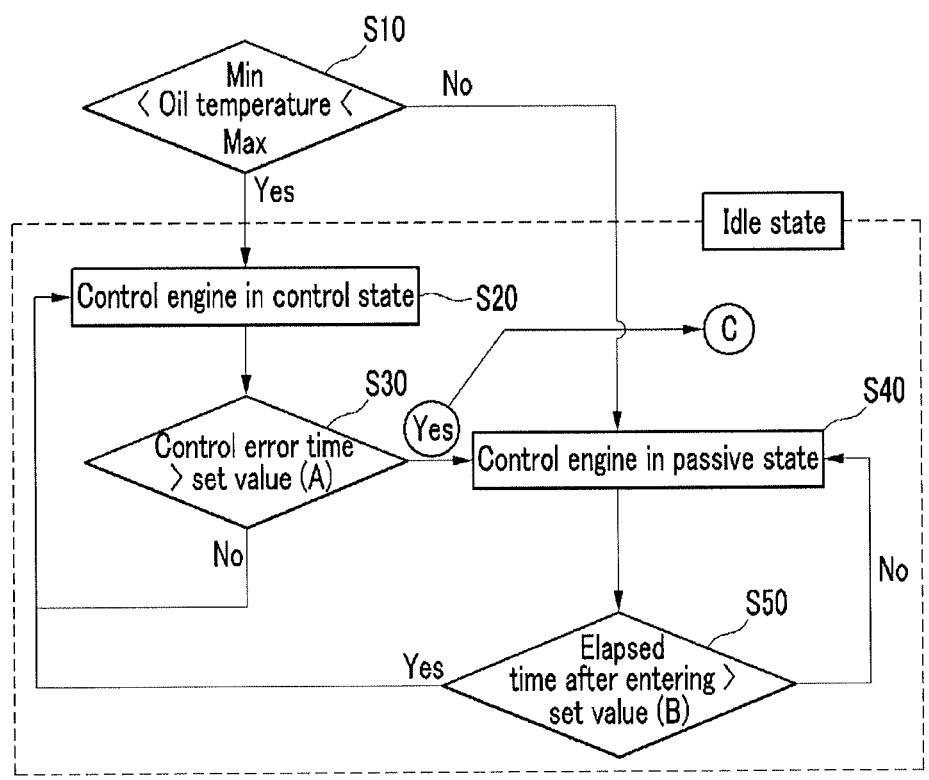
FIG. 2 is a flowchart illustrating a flow of a control method of a continuous variable valve lift engine according to another exemplary embodiment of the present invention.
Figure 3:
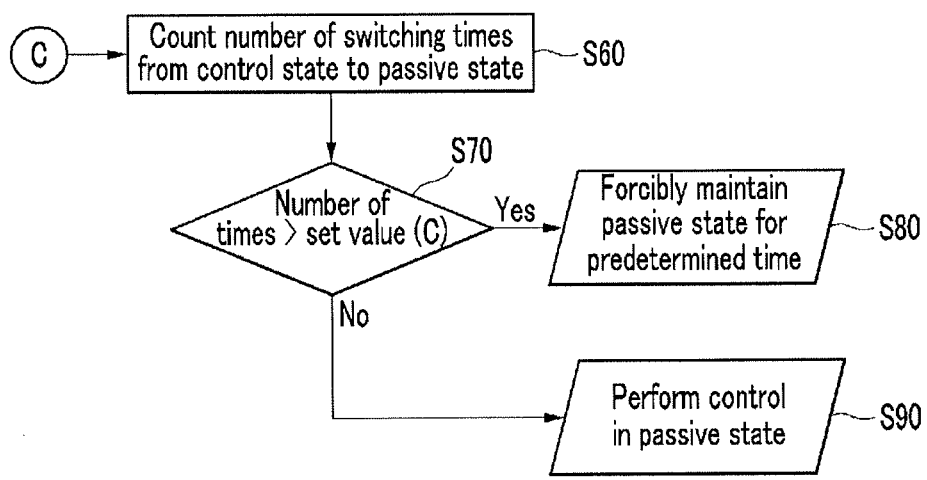
FIG. 3 is a flowchart illustrating a flow of a method for forcibly maintaining a passive state according to yet another exemplary embodiment of the present invention.

FIG. 2 is a flowchart illustrating a flow of a control method of a continuous variable valve lift engine according to another exemplary embodiment of the present invention. FIG. 3 is a flowchart illustrating a flow of a method for forcibly maintaining a passive state according to yet another exemplary embodiment of the present invention.

Referring to FIG. 2, in step S10, the control unit 100 determines whether the oil temperature is within a predetermined temperature range which is set in advance.

In one or a plurality of exemplary embodiments, the predetermined temperature range may be preset to a range between a maximum value and a minimum value of the oil temperature which is allowable in the engine 200.

In step S20, the control unit 100 controls the engine 200 to be in a predetermined control state when the determined oil temperature is within the set temperature range and the state of the engine 200 judged from the various sensors is in the idle state.

In the control state, the intake cam of the CVVL 210 is in a maximum advancing state, the RPM of the engine 200 is a set basic idle RPM, and the valve lift is in a predetermined high lift state.

In one or the plurality of exemplary embodiments, the basic idle RPM may be set as approximately 650 to 700 RPM, and the high lift value may be in a state in which the valve lift is 6 mm or more. Therefore, the control unit 100 attempts to control the valve lift to 6 mm or more by controlling the CVVL 210, control the RPM of the engine 200 to 700 RPM, and control the intake cam to be in the maximum advancing state.

When the engine 200 is in the control state according to the control of the control unit 100, knocking may be prevented because self-ignition does not occur although the valid compression ratio in the cylinder 230 is decreased and thus the engine 200 tips in the idle state. When the engine 200 is in the control state, it is advantageous in terms of fuel efficiency by the high lift and maximum advancing of the intake cam.

In step S30, the control unit 100 determines whether an error occurs in the control to the control state.

In detail, the error may be defined as an unable advancing state in which the intake cam is not advanced up to a set target (maximum advancing).

That is, the control unit 100 controls the engine 200 in the control state according to step S20, and in this case, although the intake cam needs to be in the maximum advancing state, when the engine 200 is in the idle state, the RPM of the engine 200 is low and the oil pressure is insufficient, and as a result, the intake cam may not be advanced.

In one or the plurality of exemplary embodiments, the control unit 100 monitors the cam timing from the time when the engine is controlled in the control state to determine that the error occurs when a movement average value of differences between the cam timing when the intake cam is in the maximum advancing state and a cam timing which is actually measured is larger than a predetermined set value. Herein, the actual cam timing may be measured by a cam sensor.

When the computed movement average value is equal to or less than the set value, it is determined that the error does not occur, and thus the control unit 100 returns to step S20 to continuously control the engine 200 in the control state.

When the computed movement average value is more than the set value, the control unit 100 determines that the error occurs.

In step S40, the control unit 100 measures the error occurrence time when the error occurs as described above, and when the movement average value of the error occurrence time is more than a preset time A, the control unit 100 controls the engine 200 while switching the engine 200 to be in a predetermined passive state.

The passive state may be defined as a state in which the intake cam is in a parking state, the speed of the engine 200 is more than the basic idle RPM, and the valve lift is a predetermined low lift.

In one or the plurality of exemplary embodiments, in the passive state, the intake cam is in the parking state in which the intake cam is not advanced or retarded, the RPM of the engine 200 in the passive state may be 850 RPM, and the low lift may be in a state in which the valve lift is equal to or less than 2 mm.

When the engine 200 is in the passive state, knocking may be prevented because self-ignition does not occur although the valid compression ratio in the cylinder 230 is decreased and thus the engine 200 tips in the idle state. However, the passive state is more disadvantageous than the control state in terms of the fuel efficiency.

In step S50, when the elapsed time after the control unit 100 enters the passive state according to step S40 is more than a predetermined time B, the process returns to step S20 to switch the engine 200 to the control state again.

As described above, since the passive state is more disadvantageous than the control state in terms of the fuel efficiency, the engine 200 is again switched to the control state after the predetermined time elapsed in order to improve the fuel efficiency.

When the process returns from step S50 to step S20, step S30 is also performed again, and when the control error occurrence time is more than the set time A in step S30, the engine 200 is controlled while being switched to the passive state again in step S40. That is, steps S20 to S50 are repeated.

Meanwhile, in step S60, when the control state (S30) is switched to the passive state (S40), the control unit 100 counts the number of switching times as illustrated in FIG. 3.

In step S70, the control unit 100 determines whether the counted number of times is more than a set value C which is set in advance.

In step S80, when the counted number of times is more than the set value C, the control unit 100 forcibly maintains the passive state for a predetermined time to prevent the engine 200 from being switched to the control state. Meanwhile, after the predetermined time when the passive state of the engine 200 is forcibly maintained elapsed, the process returns to step S20 or S40 to control the state of the engine.

In step S90, the control unit 100 repeatedly performs steps S20 to S50 by returning to step S40 when the counted number of times is not more than the set value C.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for a continuous variable valve lift (CVVL) engine, comprising:
   determining, by a control unit of a vehicle, whether the engine is in an idle state and an oil temperature of the engine is within a predetermined range;
   controlling, by the control unit, the engine in a predetermined control state when the engine is in the idle state and the oil temperature is within the predetermined range; and
   measuring, by the control unit, an error occurrence time when an error occurs in controlling the engine in the predetermined control state, and controlling the engine while switching the engine to a predetermined passive state when the error occurrence time is more than a preset time,
   wherein in the predetermined control state, an intake cam of the CVVL engine is in a maximum advancing state, an engine speed is a set basic idle RPM, and a valve lift is in a predetermined high lift state, and
   wherein in the predetermined passive state, the intake cam is in a parking state, the engine speed is larger than the basic idle RPM, and the valve lift is in a predetermined low lift state.

2. The method of claim 1, wherein the error represents a state in which the intake cam is not advanced.

3. The method of claim 1, wherein the control unit monitors a cam timing at the time of controlling the engine in the predetermined control state to determine that the error occurs when a difference between the cam timing when the intake cam is in the maximum advancing state and an actually measured cam timing is more than a set value.

4. The method of claim 1, further comprising:
   switching, by the control unit, the engine to the predetermined control state when an elapsed time after entering the passive state is more than a set value.

5. The method of claim 1, further comprising:
   counting, by the control unit, the number of times to switch the predetermined control state to the passive state, and forcibly maintaining the passive state for a predetermined time when the counted number of times is more than a set value.

6. The method of claim 1, wherein the high lift represents a state in which the valve lift is 6 mm or more.

7. The method of claim 1, wherein the low lift represents a state in which the valve lift is 2 mm or less.

8. A control system of controlling a continuous variable valve lift (CVVL) engine, comprising:
   a variable sensor detecting a valve lift value;
   an oil temperature sensor detecting an oil temperature;
   a sensor measuring a required torque and rotational speed;
   a position sensor detecting intake/exhaust cam position;
   a throttle position sensor detecting an opening level of a throttle valve;
   a fuel injection sensor measuring a fuel injection amount;
   a sensor measuring an ignition timing;
   a cam sensor detecting a cam timing; and
   a control unit that receives information including the valve lift value, the oil temperature, the required torque and rotational speed, the intake/exhaust cam position, the throttle opening level, the fuel injection amount, the ignition timing, and the cam timing,
   wherein the control unit determines whether the engine is in an idle state and an oil temperature of the engine is within a predetermined range;
   wherein the control unit controls the engine in a predetermined control state when the engine is in the idle state and the oil temperature is within the predetermined range; and
   wherein the control unit measures an error occurrence time when an error occurs in controlling the engine in the predetermined control state, and controlling the engine while switching the engine to a predetermined passive state when the error occurrence time is more than a preset time,
   wherein in the predetermined control state, an intake cam of the CVVL engine is in a maximum advancing state, an engine speed is a set basic idle RPM, and a valve lift is in a predetermined high lift state, and
   wherein in the predetermined passive state, the intake cam is in a parking state, the engine speed is larger than the basic idle RPM, and the valve lift is in a predetermined low lift state.

9. The control system of claim 8, wherein the error represents a state in which the intake cam is not advanced.

10. The control system of claim 8, wherein the control unit monitors a cam timing at the time of controlling the engine in the predetermined control state to determine that the error occurs when a difference between the cam timing when the intake cam is in the maximum advancing state and an actually measured cam timing is more than a set value.

11. The control system of claim 8, wherein the control unit switches the engine to the predetermined control state when an elapsed time after entering the passive state is more than a set value.

12. The control system of claim 8, wherein the control unit counts the number of times to switch the predetermined control state to the passive state, and forcibly maintaining the passive state for a predetermined time when the counted number of times is more than a set value.

13. The control system of claim 8, wherein the high lift represents a state in which the valve lift is 6 mm or more.

14. The control system of claim 8, wherein the low lift represents a state in which the valve lift is 2 mm or less.

* * * * *